(12) United States Patent
Hamada

(10) Patent No.: US 11,842,087 B2
(45) Date of Patent: Dec. 12, 2023

(54) CONTROL APPARATUS, CONTROL METHOD, AND STORAGE MEDIUM

(71) Applicant: CANON KABUSHIKI KAISHA, Tokyo (JP)

(72) Inventor: Ryuhei Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/351,138

(22) Filed: Jun. 17, 2021

(65) Prior Publication Data

US 2021/0311673 A1   Oct. 7, 2021

Related U.S. Application Data

(63) Continuation of application No. 16/893,843, filed on Jun. 5, 2020, now Pat. No. 11,079,976.

(30) Foreign Application Priority Data

Jun. 28, 2019   (JP) .................................. 2019-121765

(51) Int. Cl.
  *G06F 3/12*       (2006.01)
  *H04N 1/00*       (2006.01)

(52) U.S. Cl.
  CPC .......... *G06F 3/1204* (2013.01); *G06F 3/1255* (2013.01); *H04N 1/0049* (2013.01); *H04N 1/00488* (2013.01)

(58) Field of Classification Search
  CPC .... G06F 3/1204; G06F 3/1255; G06F 3/1234; G06F 3/121; G06F 3/1285; H04N 1/0049; H04N 1/00488

(Continued)

(56) References Cited

U.S. PATENT DOCUMENTS 7,170,626 B2 *  1/2007  Shijo .................... H04N 1/603
                                                358/1.13
8,625,136 B2    1/2014  Golle et al. ................. 358/1.15
(Continued)

FOREIGN PATENT DOCUMENTS

JP       2016-099800         5/2016

OTHER PUBLICATIONS

Sasaki Tomohiko; JP 2010-204694; 2010; English Translation (Year: 2010).*

(Continued)

*Primary Examiner* — Neil R McLean
(74) *Attorney, Agent, or Firm* — Venable LLP

(57) ABSTRACT

An image printing apparatus, which displays a two-dimensional code, includes: a display device; a two-dimensional code key configured to receive an operation from a user; and an LED equipped separately from the display device and configured to provide a predetermined notification separately from a screen displayed by the display device. A CPU is configured to control the display device to display a predetermined screen and the LED is configured to provide the predetermined notification based on a case where a predetermined condition for changing a screen displayed by the display unit is satisfied, and the CPU is configured to control the display unit to display the predetermined code in a case where the operation is received by the two-dimensional code key from the user while the predetermined screen is being displayed by the display device and the predetermined notification is being provided by the LED.

18 Claims, 13 Drawing Sheets

(58) Field of Classification Search
USPC .......................................................... 358/1.13
See application file for complete search history.

(56) References Cited

U.S. PATENT DOCUMENTS

| | | | |
|---|---|---|---|
| 10,244,037 B2* | 3/2019 | Yagiura | H04L 67/025 |
| 2011/0085196 A1* | 4/2011 | Liu | G06F 3/1204 |
| | | | 358/1.15 |
| 2013/0169996 A1* | 7/2013 | McLeod | G06F 11/0733 |
| | | | 358/3.28 |
| 2014/0233061 A1 | 8/2014 | Yamada | 358/1.15 |
| 2014/0334834 A1* | 11/2014 | Katsuyama | G03G 15/6502 |
| | | | 399/21 |
| 2016/0085716 A1 | 3/2016 | Yoshizawa et al. | 708/146 |
| 2016/0085717 A1 | 3/2016 | Ono et al. | 708/130 |
| 2016/0085845 A1 | 3/2016 | Yoshizawa | 709/204 |
| 2016/0086362 A1 | 3/2016 | Suzuki et al. | 345/440 |
| 2016/0086512 A1 | 3/2016 | Yoshizawa | 434/201 |
| 2017/0090553 A1 | 3/2017 | Hiraike | G06F 1/3231 |
| 2018/0182021 A1* | 6/2018 | Sugamata | H04L 67/10 |
| 2018/0183974 A1 | 6/2018 | Cao | G06F 3/1229 |
| 2019/0034379 A1 | 1/2019 | Ono et al. | G06F 17/16 |

OTHER PUBLICATIONS

Yu-Cheng Lin, Weng-Fong Cheung, Fu-Cih Siao, "Developing mobile 2D barcode/RFID-based maintenance management system", Automation in Construction, vol. 37, 2014, pp. 110-121, ISSN 0926-5805, https://doi.org/10.1016/j.autcon.2013.10.004.

* cited by examiner

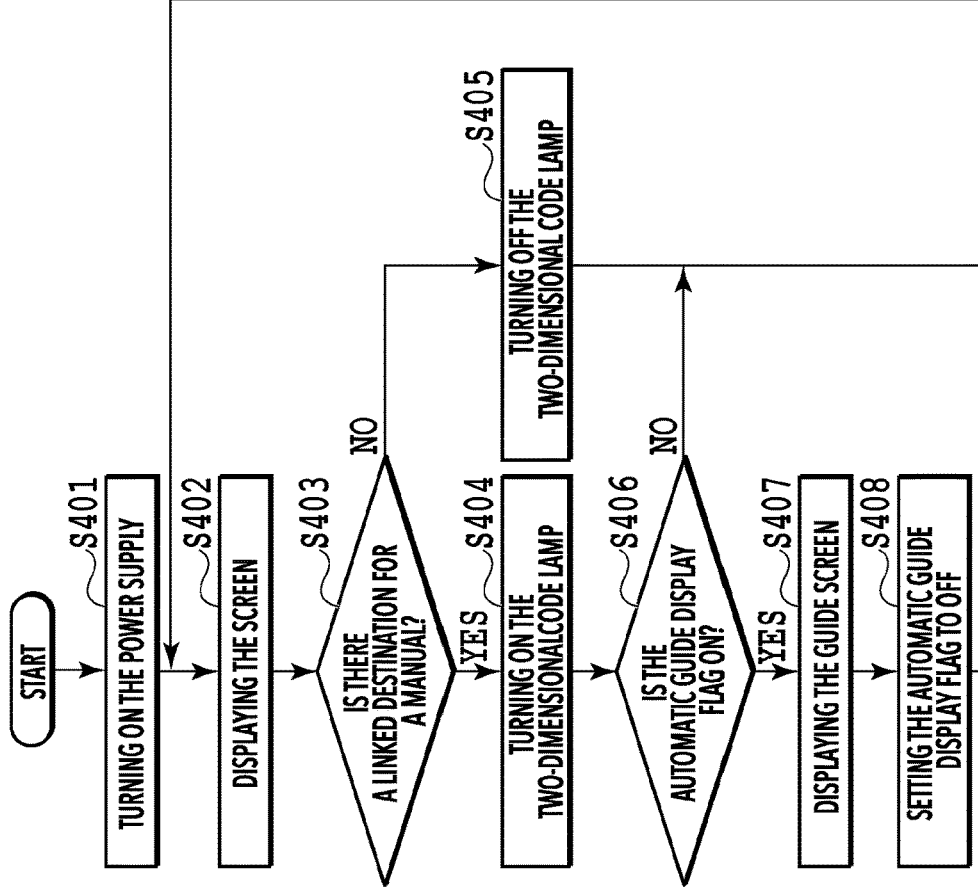

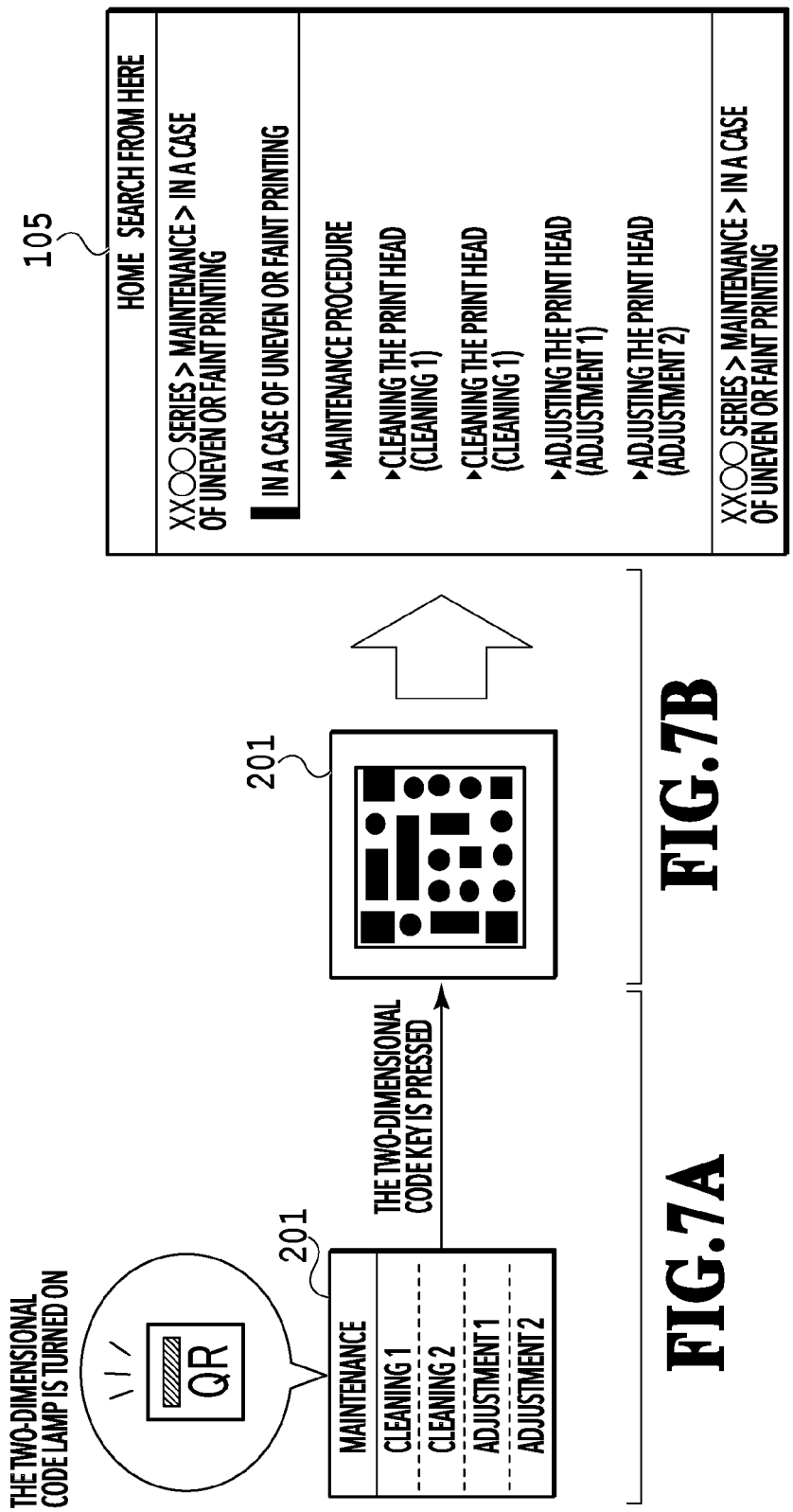

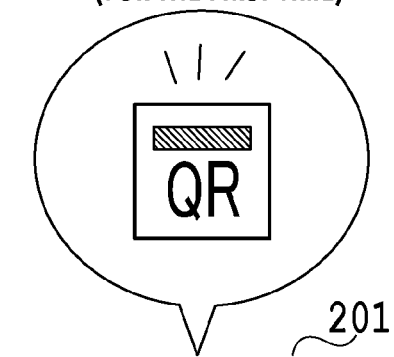
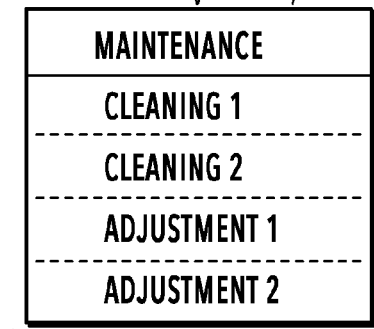
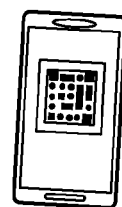
FIG.9A
FIG.9B

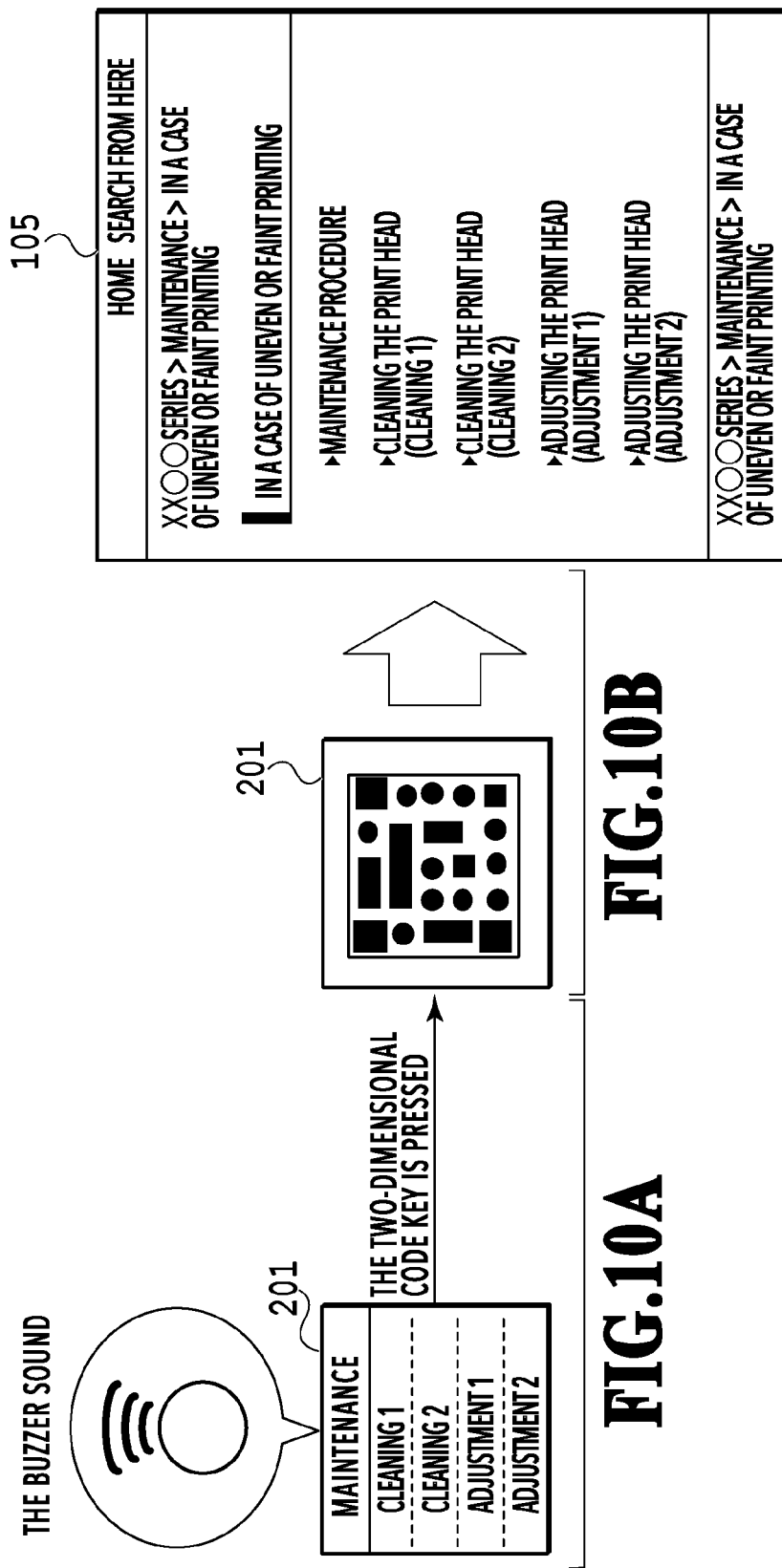

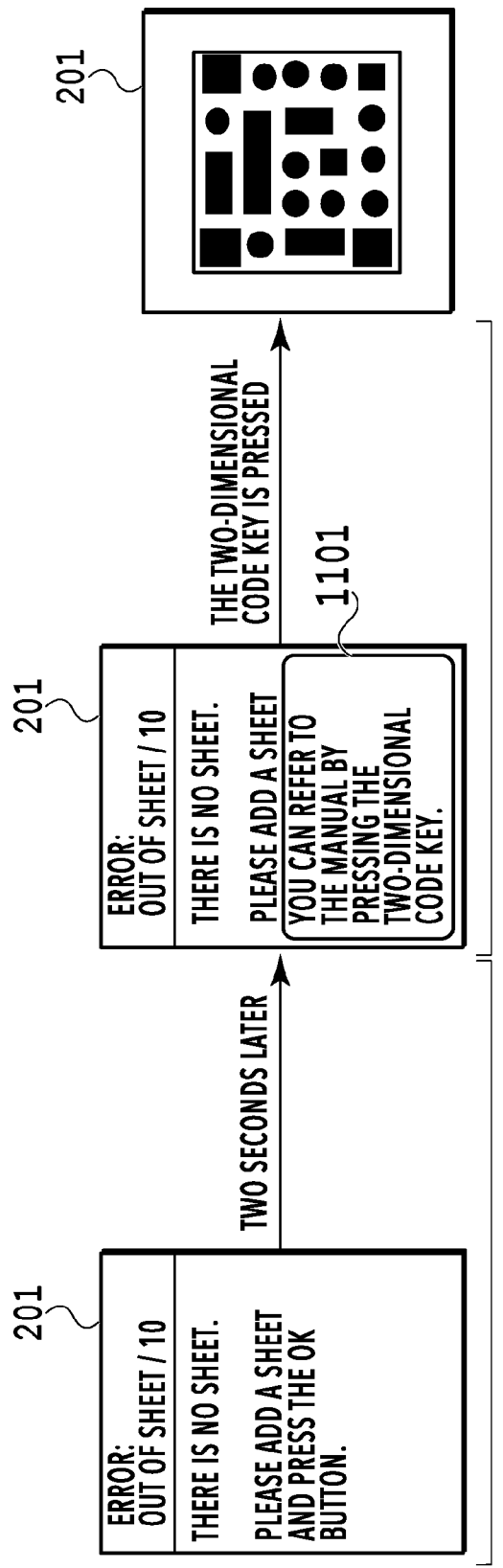

CONTROL APPARATUS, CONTROL METHOD, AND STORAGE MEDIUM

This application is a continuation of application Ser. No. 16/893,843 filed Jun. 5, 2020, currently pending; and claims priority under 35 U.S.C. § 119 to Japan Application No. 2019-121765 filed in Japan on Jun. 28, 2019; and the contents of all of which are incorporated herein by reference as if set forth in full.

BACKGROUND OF THE INVENTION

Field of the Invention

The present disclosure relates to a technology for controlling a notification unit according to contents displayed on a display device.

Description of the Related Art

In general, it is often the case that a display device mounted on a printer is small in size and has a limited expression capability. For this reason, in a case where an unclear point arises for a user, the user refers to a manual in a paper or electronic medium, so as to deal with the unclear point.

Japanese Patent Laid-Open No. 2016-99800 (hereinafter referred to as Literature 1) discloses a technology for displaying a two-dimensional code indicating a URL for an explanation page of a manual, which corresponds to the contents of a command being displayed on an electronic apparatus, on a display device of the electronic apparatus in response to pressing of a QR key of the electronic apparatus. It is disclosed that, in a case where the two-dimensional code is read by a mobile terminal with a camera, the explanation page of the manual stored at the linked destination of the URL is displayed on a browser of the mobile terminal.

However, regarding such a technology related to displaying of a code as disclosed in Literature 1, the degree of necessity of displaying the code varies depending on various conditions such as the state of the apparatus. It is possible that the user does not notice displaying of the code in such a case where the necessity for displaying the code is high, and it is also possible that the user performs an operation for displaying the code in such a case where the necessity for displaying the code is low.

SUMMARY OF THE INVENTION

The control apparatus according to an embodiment of the present disclosure is a control apparatus that displays a predetermined code, the control apparatus including: a display unit; a reception unit configured to receive an operation from a user; a notification unit equipped separately from the display unit and configured to provide a predetermined notification separately from a screen displayed by the display unit; and a control unit configured to control the display unit to display the predetermined screen or the predetermined code, wherein, based on a case where a predetermined condition for changing a screen displayed by the display unit is satisfied, the control unit is configured to control the display unit to display a predetermined screen and the notification unit is configured to provide the predetermined notification, and wherein, in a case where the operation is received by the reception unit from the user while the predetermined screen is being displayed by the display unit and the predetermined notification is being provided by the notification unit, the control unit is configured to control the display unit to display the predetermined code.

Further features of the present invention will become apparent from the following description of exemplary embodiments with reference to the attached drawings.

BRIEF DESCRIPTION OF THE DRAWINGS

FIG. 4 is a diagram showing the relationship of FIGS. 4A and 4B;

FIGS. 4A and 4B are totally a flowchart illustrating two-dimensional code generation control processing;

FIGS. 7A through 7C are diagrams for explaining operation example 1;

FIGS. 9A and 9B are diagrams for explaining operation example 3;

FIGS. 10A through 10C are diagrams for explaining operation example 4;

FIGS. 11A through 11C are diagrams for explaining operation example 5; and

DESCRIPTION OF THE EMBODIMENTS

Hereinafter, an explanation is given of embodiments according to the present disclosure with reference to the drawings. It is not intended that the embodiments below limit the present disclosure, and all of the combinations of the characteristics explained in the present embodiments are not necessarily essential. The same reference sign is assigned for explanations of the same configuration.

First Embodiment

In the present embodiment, an explanation is given of the example in which, in a case where a manual corresponding to the screen being displayed on a display unit of an image printing apparatus is present, the user is notified of the presence of the manual by use of a notification unit (for example, an LED). As described above, in the present embodiment, the notification unit is equipped separately from the display unit, so that a notification is provided by the notification unit separately from display of a screen by the display unit. The user recognizes an event (for example, the presence of a manual page) indicated by notification by the notification unit (for example, LED being turned on). Then, upon checking the LED being turned on, the user performs a predetermined operation to the image printing apparatus in a case where the user desires to check the manual for the screen being displayed on the display unit. Upon receiving the predetermined operation, the image printing apparatus displays a two-dimensional code indicating the location of the manual page on the display unit. The user can check the corresponding manual on a mobile terminal by reading the two-dimensional code being displayed on the display unit with the camera of the mobile terminal.

<System Configuration>

Figure 1:
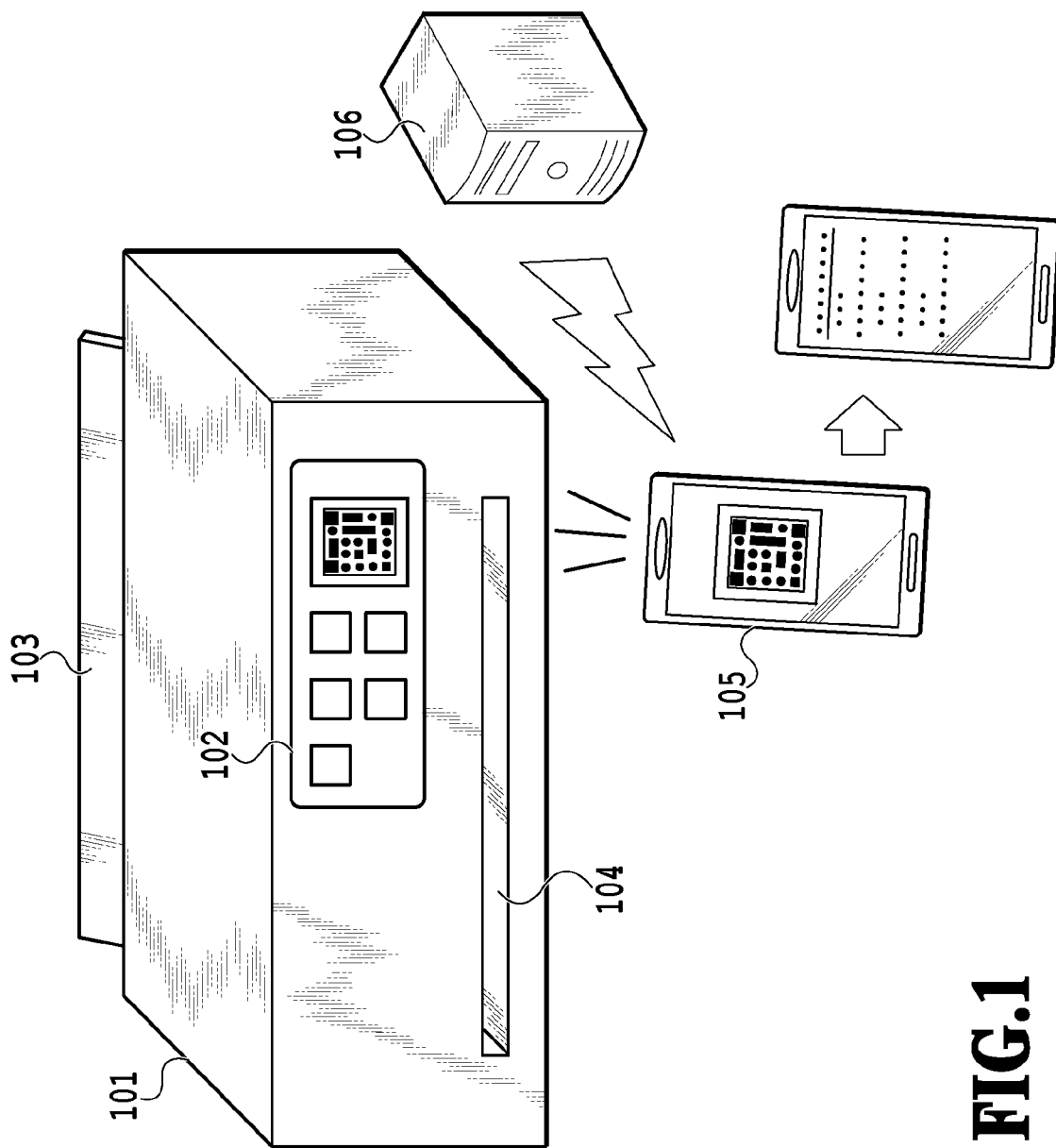
FIG. 1 is a diagram illustrating a configuration of a system and a schematic configuration of the outer appearance thereof.

FIG. 1 is a diagram illustrating a configuration of an information processing system according to the present embodiment and a schematic configuration of the outer appearance thereof. As illustrated in FIG. 1, the information processing system according to the present embodiment includes an image printing apparatus 101, a mobile terminal 105, and a manual server 106. In the explanation of the present embodiment, it is assumed that the image printing apparatus 101 is a multi-function printer (MFP). However, it is also possible that the image printing apparatus 101 is a single function printer (SFP). The image printing apparatus 101 includes an operation panel 102, a feeding unit 103, and a discharge tray 104. The sheets that are set in the feeding unit 103 are conveyed one by one to a printer (not illustrated in FIG. 1), so that printing is performed on a sheet and the sheet is discharged from the discharge tray 104. The operation panel 102 is a reception unit (input unit) that receives input of a setting value or an instruction for execution of processing from the user. The operation panel 102 is equipped on the outer surface of the image printing apparatus 101.

In FIG. 1, the example in which a two-dimensional code displayed on the operation panel 102 of the image printing apparatus 101 is read by the mobile terminal 105 such as a smartphone or a tablet is illustrated. In this example, a two-dimensional code indicates a URL corresponding to a predetermined address of the manual server 106. A browser of the mobile terminal 105 accesses the address corresponding to the read URL, so that the manual page of the manual server 106 is displayed on the screen of the mobile terminal 105.

<Explanation of the Operation Panel>

Figure 2:
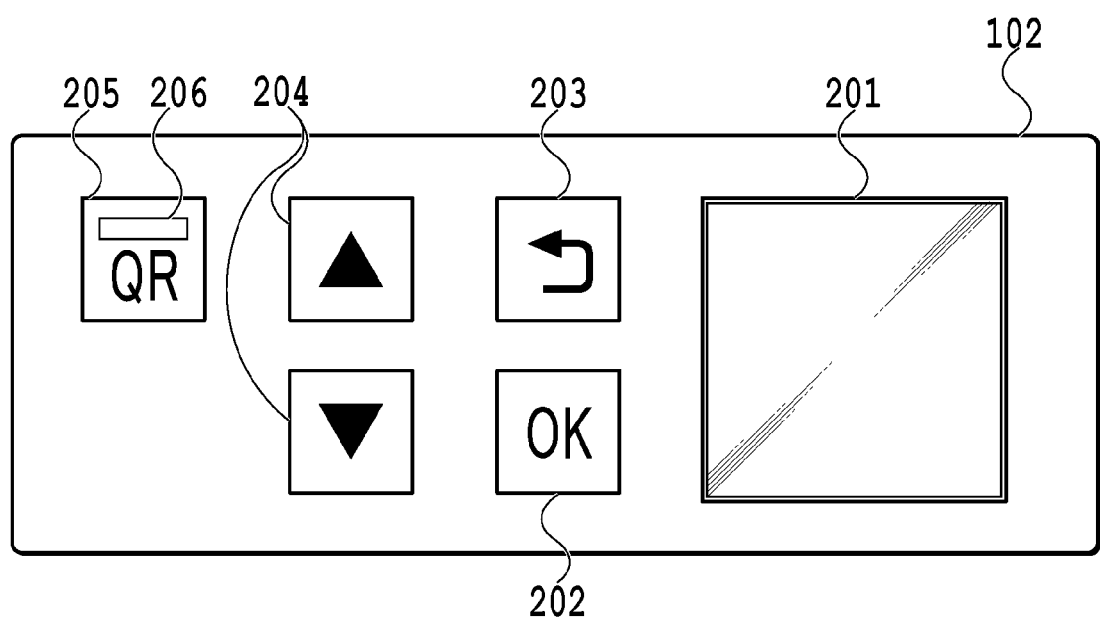
FIG. 2 is a diagram illustrating the outer appearance of an operation panel.

FIG. 2 is a diagram illustrating the outer appearance of the operation panel 102, which is an operation unit. As illustrated in FIG. 2, the operation panel 102 includes a display device 201, up/down keys 204, an OK key 202, a return key 203, a two-dimensional code key 205, and an LED 206 (notification unit).

The up/down keys 204, the OK key 202, the return key 203, and the two-dimensional code key 205 are included in the hard key group 319 (see FIG. 3) to be described later. The display device 201 is a liquid crystal display device or an organic EL display device, for example. The display device 201 in the present embodiment is smaller than the display screen of the mobile terminal 105, as illustrated in FIGS. 1 and 2. Therefore, the information amount that can be displayed by the display device 201 is less than the mobile terminal 105. The up/down keys 204, the OK key 202, and the return key 203 are keys (buttons) used for selecting a function, for setting, or the like.

The two-dimensional code key 205 is a key used for receiving an instruction for generating a two-dimensional code from the user. A QR code (registered trademark) is an example of the two-dimensional code. In FIG. 2, "QR" is written on the two-dimensional code key 205 as a notation indicative of a two-dimensional code. In the example of FIG. 2, in a case where the two-dimensional code key 205 is pressed, a two-dimensional code corresponding to the contents being displayed on the display device 201 at that moment is generated. The generated two-dimensional code is displayed on the display device 201. The code in the present embodiment is not limited to a two-dimensional code, and it is also possible that the code is a barcode, or the like. Furthermore, depending on the contents being displayed on the display device 201, a predetermined message may be displayed instead of a two-dimensional code. Details of these will be described later.

The LED 206 is a notification unit that indicates whether the two-dimensional code key 205 is effective. In the present embodiment, the LED 206 is turned on in a case where the two-dimensional code key 205 is effective and is turned off in a case where the two-dimensional code key 205 is ineffective. By the two-dimensional code key 205 being effective, it means that, in a case where the two-dimensional code key 205 is pressed, it is possible to display the corresponding two-dimensional code. In a case where the two-dimensional code key 205 is pressed while the LED 206 is on, the two-dimensional code corresponding to the contents being displayed on the display device 201 at that moment is generated.

<Functional Configuration of the Image Printing Apparatus>

Figure 3:
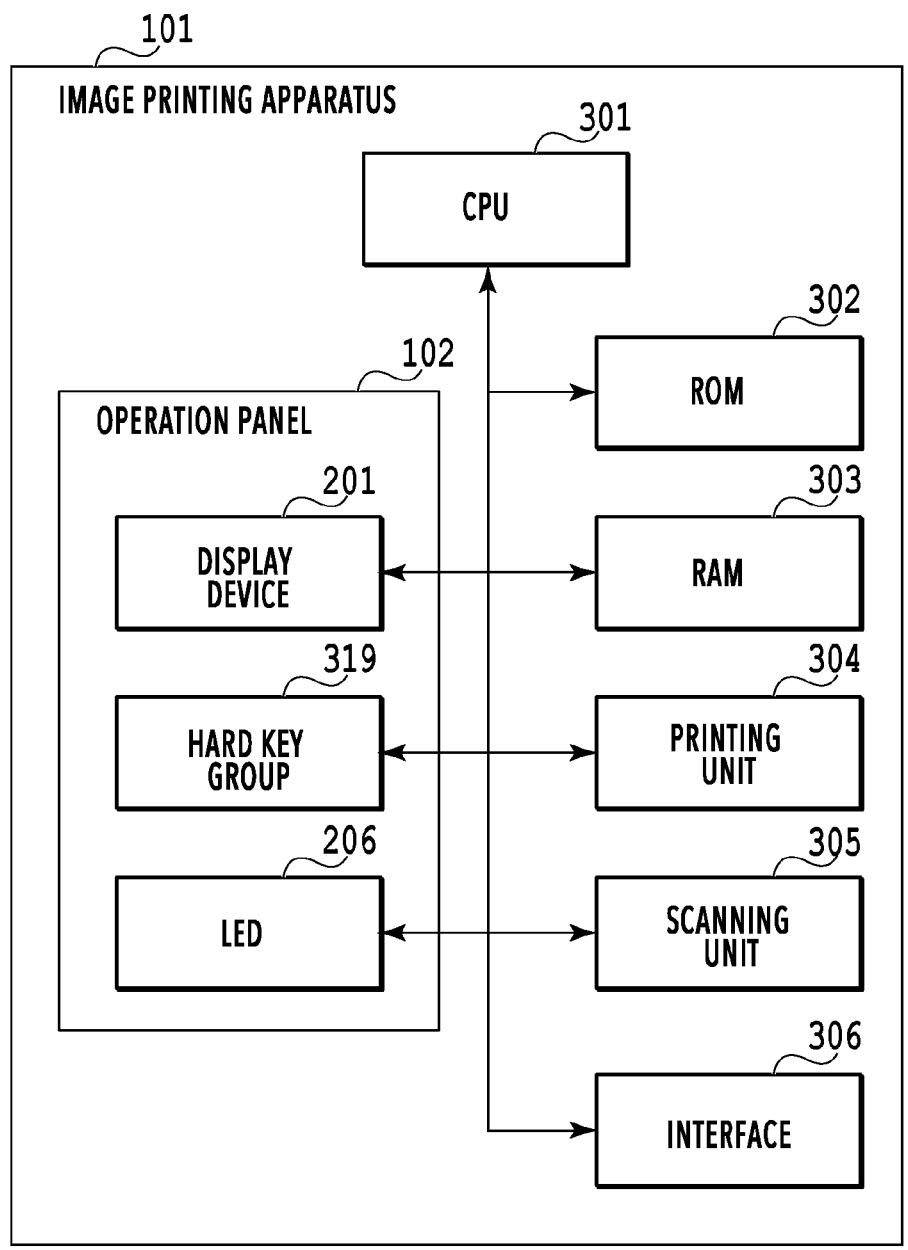
FIG. 3 is a block diagram illustrating a configuration of a control system of an image printing apparatus.

FIG. 3 is a block diagram illustrating the configuration of the control system of the image printing apparatus 101 according to the present embodiment. The image printing apparatus 101 includes a CPU 301, a ROM 302, a RAM 303, a printing unit 304, a scanning unit 305, an interface 306, and an operation panel 102.

The CPU 301 entirely controls the image printing apparatus 101 via a system bus. The ROM 302 stores program codes of the main body, initial value data, and various kinds of tables. The RAM 303 is an image buffer that temporarily saves image data read by the scanning unit 305 and print image data sent via the interface 306.

The printing unit 304 includes a printing engine of an inkjet system, and the printing unit 304 prints an image saved in the RAM 303 on a print sheet. The scanning unit 305 performs photo-electric conversion for converting an optically-read image into electrical image signals by use of a contact image sensor. The interface 306 performs wireless or wired network communication, and the interface 306 is used for transmission and reception of information or a command to and from an external device.

The operation panel 102 includes the display device 201, the hard key group 319, and the LED 206. The display device 201 displays a state of the image printing apparatus 101, various kinds of menu screens, main body information of the image printing apparatus 101, or the like. Furthermore, the display device 201 displays a two-dimensional code. The CPU 301 controls the operation panel 102 equipped on the outer surface of the image printing apparatus 101. The CPU 301 is capable of displaying desired information on the display device 201 arranged on the operation panel 102 and is capable of monitoring operations performed by the user to the hard key group 319 on the operation panel 102.

In the ROM 302 of the present embodiment, a "program for controlling generation of a two-dimensional code", a "two-dimensional code correspondence table", and "product information" are stored in addition to the various kinds of data described above.

The "program for controlling generation of a two-dimensional code" is a program for making the CPU 301 to execute the two-dimensional code generation control processing (see FIGS. 4A and 4B) to be described later. The "two-dimensional code correspondence table" (see FIG. 5) is information to be referred to in a process of turning the LED 206 on. Furthermore, the "two-dimensional code correspondence table" is information to be referred to in a two-dimensional code generation process as well.

The "two-dimensional code correspondence table" stores a "category" for indicating a URL of a linked destination corresponding to a screen ID for identifying the display screen being displayed on the display device. Furthermore, the two-dimensional code correspondence table stores an "error code". A "category" included in the two-dimensional code correspondence table indicates the name of an operation explanation page in the manual at a linked destination. An "error code" included in the two-dimensional code correspondence table indicates the error number on an error handling method explanation page in the manual at a linked destination. Details of the contents of the two-dimensional code correspondence table will be described later with reference to FIG. 5.

The "product information" is information including a "product code" and a "product destination". The product information is utilized as a constituent element of a URL indicating a linked destination in a case of generating a two-dimensional code. A "product code" is a number for specifying the model of the image printing apparatus 101. A "product destination" is a number for specifying the region to which the product is shipped.

<Processing by the Image Printing Apparatus>

Although the image printing apparatus 101 performs various kinds of processing, the following explanation is mainly given of the two-dimensional code generation control processing. The two-dimensional code generation control processing includes control processing for turning the LED 206 on and off, processing in response to pressing of the two-dimensional code key 205, and URL generation processing.

<Control Processing for Turning the LED on and Off and Processing in Response to Pressing of the Two-Dimensional Code Key>

Figure 4B:
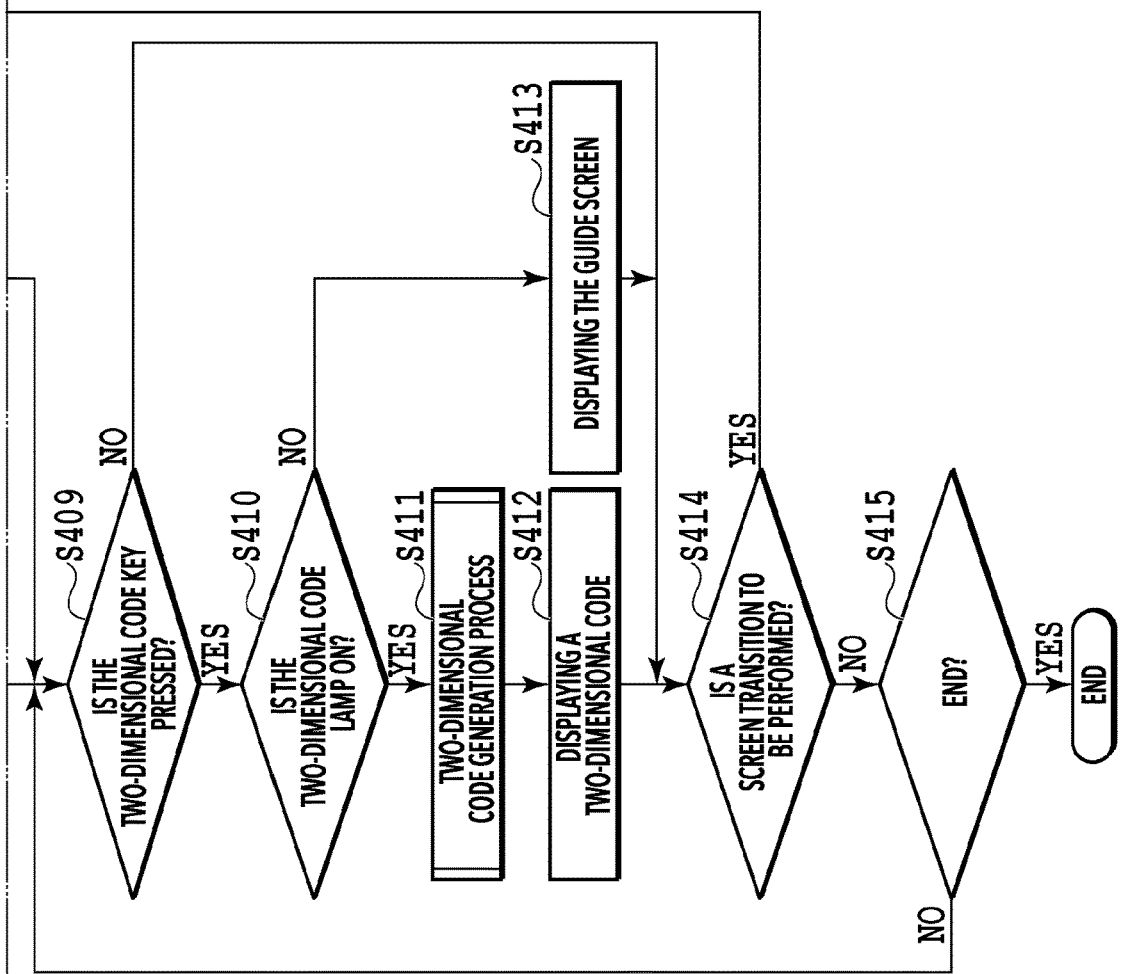

FIGS. 4A and 4B are totally a flowchart illustrating the two-dimensional code generation control processing in the present embodiment. In FIGS. 4A and 4B, the control processing for turning the LED 206 on and off and the processing in response to pressing of the two-dimensional code key 205 are included. The series of processes illustrated in the flowchart of FIGS. 4A and 4B is performed by the CPU 301 retrieving a program code stored in the ROM 302 into the RAM 303 and executing the program code. Alternatively, a part or all of the functions in the steps of FIGS. 4A and 4B may be implemented by hardware such as an ASIC or an electronic circuit. The symbol "S" in the explanation of each process means that it is a step of the flowchart.

In S401, the power supply of the image printing apparatus 101 is turned on, so that the processing starts. The CPU 301 of the image printing apparatus 101 repeats the processes from S402 in a case where the power supply is on.

In S402, the CPU 301 displays a predetermined screen on the display device 201 in response to an operation by the user through the operation panel 102. In the explanation of the present example, a screen is displayed on the display device 201 in response to an operation by the user through the operation panel 102. However, it is also possible that a screen is displayed on the display device 201 in response to reception of a print job from an external host apparatus (not illustrated in the drawings), or the like.

Figure 5:
FIG. 5 is a diagram illustrating an example of a two-dimensional code correspondence table.

In S403, the CPU 301 refers to the two-dimensional code correspondence table as illustrated in FIG. 5, so as to determine whether there is a linked destination for a manual corresponding to the screen being displayed on the display device 201. In a case where there is a linked destination for a manual, the processing proceeds to S404, and, otherwise, the processing proceeds to S405.

FIG. 5 is a diagram illustrating an example of the two-dimensional code correspondence table 500. In the present embodiment, a screen ID for identifying a screen is assigned for each screen to be displayed on the display device 201. In the two-dimensional code correspondence table 500, a screen ID, an error code, and a category are stored in association with each other. The category included in the two-dimensional code correspondence table 500 indicates the name of an operation explanation page in the manual at the linked destination. In FIG. 5, a screen ID for which a corresponding category is not present (ID 1000) does not have a corresponding manual page (linked destination). Contrarily, a screen ID for which a corresponding category is present has a corresponding manual page. In that category, a character string corresponding to the manual page in the manual server 106 is described.

In S403, the CPU 301 refers to the two-dimensional code correspondence table 500, so that, in a case where a category corresponding to the screen ID is present, the CPU 301 determines that a linked destination for a manual is present. The categories in the two-dimensional code correspondence table 500 include a category of "ERR", which is indicative of an error. In a case where the category is "ERR", an "error code" is stored in association with the category. An "error code" is an error number corresponding to an error handling method explanation page in the manual at the linked destination.

Returning to FIG. 4A, the explanation is continued below. In a case where there is a linked destination for a manual, the CPU 301 turns on the LED 206 (also referred to as a two-dimensional code lamp) in S404. On the other hand, in a case where there is not a linked destination for a manual, the CPU 301 turns off the LED 206 in S405. In a case where the LED 206 has already been turned on in S404, the CPU 301 does not have to perform the turn-on control in S404. Similarly, in a case where the LED 206 has already been turned off in S405, the CPU 301 does not have to perform the turn-off control in S405. Upon completion of S404, the processing proceeds to S406. Upon completion of S405, the processing proceeds to S409.

After turning on the LED 206 in S404, the CPU 301 determines in S406 whether the automatic guide display flag, which is stored in the ROM 302, is on. The automatic guide display flag is a flag indicating whether a guide screen is to be automatically displayed, and the initial value thereof is set to on. In a case where the automatic guide display flag is on, the processing proceeds to S407, so that the CPU 301 displays the guide screen. The guide screen is a screen for explaining an operation guide of the LED 206 and the two-dimensional code key 205. For example, the guide screen is a screen including such explanation as "If the two-dimensional code key 205 is pressed while the LED 206 is on, a two-dimensional code for displaying a manual will be displayed." (see FIG. 9B). Details of the guide screen will be described later. After the guide screen is displayed in S407, the CPU 301 sets the automatic guide display flag to off in S408. Then, the processing proceeds to S409. On the other hand, in a case where it is determined in S406 that the automatic guide display flag is not on, the processing proceeds to S409.

As described above, the initial value of the automatic guide display flag is set to on. For example, in a case where the LED 206 is turned on for the first time after the user purchases the image printing apparatus 101, the guide screen is displayed. Accordingly, it is possible to present the user with a functional explanation and an operational explanation of the two-dimensional code key 205 and the LED 206 in a case where the user operates the image printing apparatus 101 for the first time. However, it is bothersome that the guide screen is displayed every time, and the operability for the user is deteriorated. By turning off the automatic guide display flag after the first time the guide screen is displayed, the operability for the user can be improved.

In S409, the CPU 301 determines whether the two-dimensional code key 205 is pressed. In a case where the two-dimensional code key 205 is pressed, the processing proceeds to S410. Otherwise, the processing proceeds to S414. In S410, the CPU 301 determines whether the LED 206 (two-dimensional code lamp) is on. In a case where the LED 206 is on, the processing proceeds to S411, and, in a case where the LED 206 is not on, the processing proceeds to S413.

In a case where the LED 206 is on, the CPU 301 performs a two-dimensional code generation process in S411. The two-dimensional code to be generated is a code representing a URL for accessing the manual page corresponding to the screen being displayed on the display device 201. Details of the two-dimensional code generation process will be described later. Thereafter, in S412, the CPU 301 displays the generated two-dimensional code on the display device 201. Then, the processing proceeds to S414. The user will browse the manual page corresponding to the URL indicated by the two-dimensional code by use of the mobile terminal 105.

On the other hand, if the two-dimensional code lamp (LED 206) is not on in the case where the two-dimensional code key 205 is pressed in S409, the processing proceeds to S413, so that, in S413, the CPU 301 displays the same guide screen as in S407. Although it is predictable that the user understands the functional explanation and operational explanation of the LED 206 and the two-dimensional code key 205, it is possible that the user has forgotten the explanations. That is, even though the user presses the two-dimensional code key 205 in the case where the LED 206 is not on, a two-dimensional code is not displayed on the display device 201 since a corresponding manual page is not present. For notifying the user of such an operational explanation again as a reminder, the guide screen is displayed on the display device 201 in S413. Thereafter, the processing proceeds to S414.

In S414, the CPU 301 determines whether to perform a screen transition. In a case where the screen transition is performed, the processing returns to S402, and, in a case where the screen transition is not performed, the processing proceeds to S415. For example, after the two-dimensional code is displayed in S412, in a case where the user operates the hard key group 319 after checking the manual page, the screen will transition from the screen displaying the two-dimensional code to the screen displayed prior to the two-dimensional code. In a case where the user operates the hard key group 319 in the state where the guide screen is displayed in S413, the screen will transition to the screen displayed prior to the guide screen. Furthermore, although it is possible that the screen transition is performed in response to an operation through the hard key group 319, it is also possible that a predetermined event, or the like, is a trigger for the screen transition. In a case where the power supply is not turned off in S415, the CPU 301 returns to S409, so as to repeat the processing. In a case where the power supply is turned off, the processing of the present flowchart will end.

The above is the explanation of the two-dimensional code generation control processing. As for the process of S410, although an explanation has been given of the example in which the CPU 301 determines whether the LED 206 is on, it is also possible that the CPU 301 refers to the two-dimensional code correspondence table 500 so as to determine whether there is a linked destination for a manual.

As described above, it is possible that the display device 201 appropriately switches multiple screens to be displayed as a predetermined screen for which a manual is present. Furthermore, in a case where the two-dimensional code key 205 receives an operation from the user, the CPU 301 displays the code corresponding to the screen being displayed on the display device 201 out of the two-dimensional codes corresponding respectively to the multiple screens.

<Two-Dimensional Code Generation Process>

Figure 6:
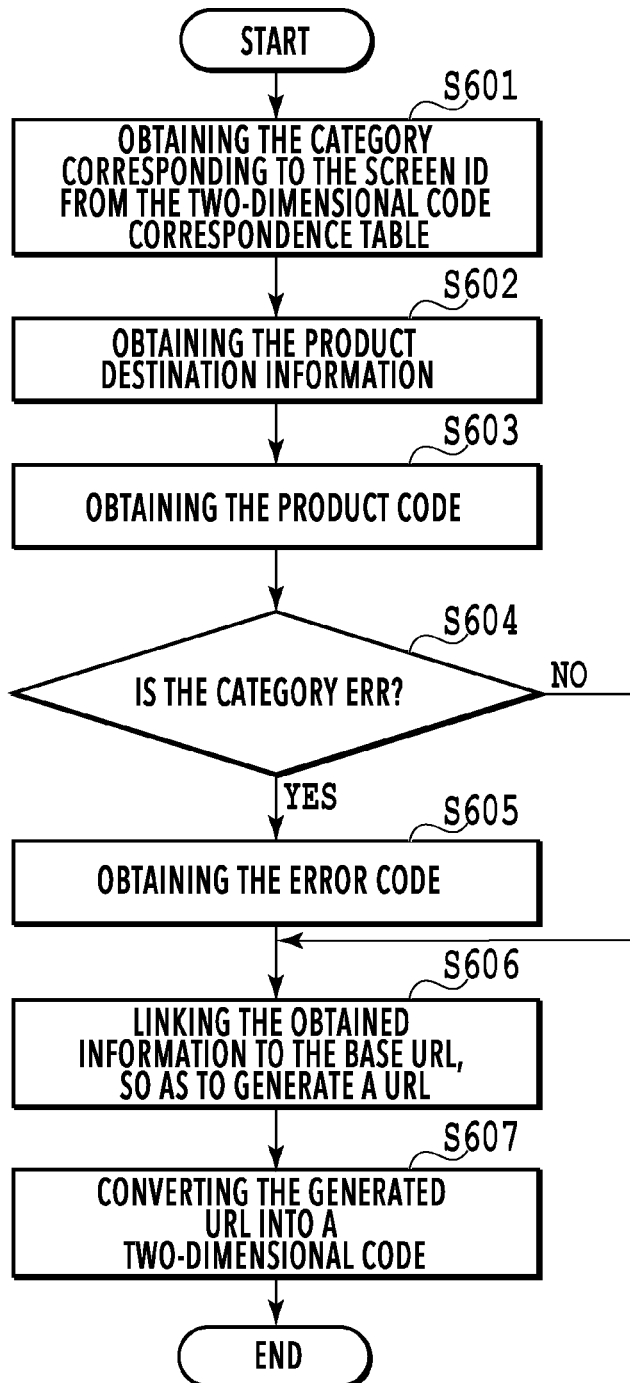
FIG. 6 is a diagram illustrating details of a two-dimensional code generation process.

FIG. 6 is a diagram illustrating details of the two-dimensional code generation process in S411 of FIG. 4B. In S601, the CPU 301 obtains the category corresponding to the screen ID of the screen being displayed on the display device 201 from the two-dimensional code correspondence table 500 as illustrated in FIG. 5. In S602, the CPU 301 refers to the product information stored in the ROM 302 and obtains product destination information. In S603, the CPU 301 refers to the product information stored in the ROM 302 and obtains a product code.

In S604, the CPU 301 determines whether the category obtained in S601 is ERR, which is indicative of an error. In a case where the category is indicative of an error, the processing proceeds to S605, so that the CPU 301 obtains the corresponding error code from the two-dimensional code correspondence table 500. The error code is used as a parameter for the manual server 106 to search for the page corresponding to the error. Thereafter, the processing proceeds to S606. In a case where the category is not ERR which is indicative of an error in S604, the process of S605 is skipped.

In S606, the CPU 301 links the obtained product destination information, product code, category, and error code (only in a case where the category is ERR) to the base URL, which indicates the manual server 106, so as to generate a URL. In S607, the CPU 301 generates a two-dimensional code by converting the URL generated in S606 into the two-dimensional code.

Specific Operation Example 1

Next, explanations are given of specific operation examples with reference to the drawings. Operation example 1 is an example in which a screen for which the two-dimensional code key 205 is effective is displayed on the display device 201. Specifically, operation example 1 is an example of a scene in which the user attempts to carry out maintenance of the image printing apparatus 101.

FIGS. 7A through 7C are diagrams for explaining operation example 1. In a case where the user presses a button in the hard key group 319 to carry out maintenance of the image printing apparatus 101, such a maintenance menu screen as illustrated in FIG. 7A is displayed on the display device 201. It is assumed that the screen ID of the screen illustrated in FIG. 7A is "ID 1002". In the two-dimensional code correspondence table 500 of FIG. 5, the category corresponding to the screen ID "ID 1002" is "MAINTE". That is, in the present example, a category corresponding to the screen ID of the screen being displayed on the display device 201 is present. Therefore, the LED 206 is turned on immediately after the screen of FIG. 7A is displayed on the display device 201. The timing of turning on the LED 206 may not be immediately after a predetermined screen is displayed. That is, the timing of turning on the LED 206 may be at the same time of displaying a predetermined screen or may be immediately before switching to a predetermined screen.

The user checks the turned-on state of the LED 206 and presses the two-dimensional code key 205. Then, as illustrated in FIG. 7B, the display device 201 displays a two-dimensional code including a URL for a maintenance function explanation page in the manual server 106, which corresponds to the product code and the language of the product destination.

After the two-dimensional code illustrated in FIG. 7B is displayed on the display device 201, the user captures the two-dimensional code with the camera of the mobile terminal 105 to read the two-dimensional code. Then, in a case where the browser of the mobile terminal 105 accesses the manual server 106, which is indicated by the URL represented by the two-dimensional code, such an explanation page of the manual is displayed on the screen of the mobile terminal 105 as illustrated in FIG. 7C. The explanation page illustrated in FIG. 7C corresponds to the explanation page for the menu screen of the maintenance function illustrated in FIG. 7A.

In this way, by checking the turn-on state of the LED 206, it is possible for the user to determine whether the screen currently displayed on the display device 201 corresponds to the two-dimensional code key 205. Furthermore, by capturing a two-dimensional code, which is displayed in response to pressing of the two-dimensional code key 205, with the camera of the mobile terminal 105, it is possible for the user to browse an explanation page of the manual corresponding to the display screen.

Specific Operation Example 2

Figure 8A:
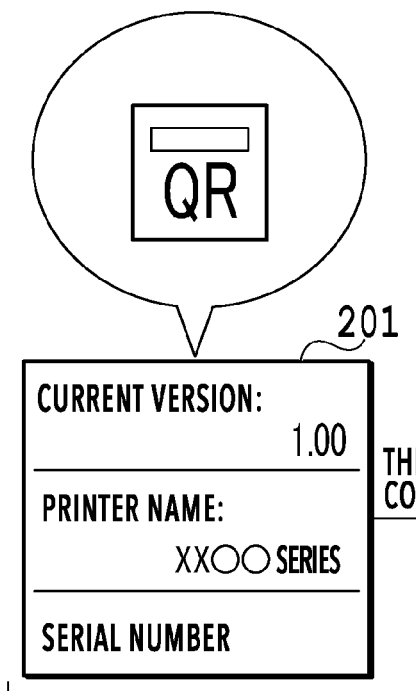
FIGS. 8A and 8B are diagrams for explaining operation example 2.
Figure 8B:
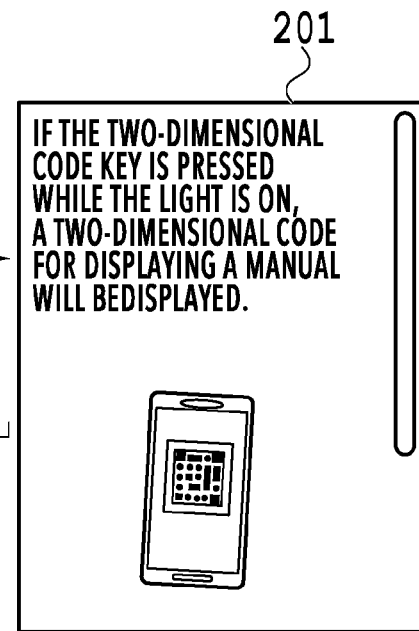

FIGS. 8A and 8B are diagrams for explaining operation example 2. Operation example 2 is an example of a scene in which the two-dimensional code key 205 is pressed in a case where the two-dimensional code key 205 is not effective. In FIG. 8A, a screen indicating product information is displayed on the display device 201. In the two-dimensional code correspondence table 500, a category corresponding to the screen ID of the screen illustrated in FIG. 8A is not present. Therefore, while the screen of FIG. 8A is displayed on the display device 201, the LED 206 is not on. In a case where the user presses the two-dimensional code key 205 in this state, such a guide screen as illustrated in FIG. 8B is displayed on the display device 201. In FIG. 8B, the contents of the display device 201 being entirely scrolled are illustrated for convenience of explanation. On the display device 201 of FIG. 8B, a message with such contents indicating that a two-dimensional code for displaying a manual will be displayed in a case where the two-dimensional code key 205 is pressed while the LED 206 is on.

In this way, since the guide screen is displayed, it is possible for the user to check the roles of the LED 206 and the two-dimensional code key 205. On the guide screen illustrated in FIG. 8B, an example of a message for such a configuration in which the LED 206 is arranged on the two-dimensional code key 205 is illustrated. In a case where the two-dimensional code key 205 and the LED 206 are arranged apart from each other, it is possible to display a guide screen illustrating the positional relationship between the two-dimensional code key 205 and the LED 206 and the roles thereof.

Specific Operation Example 3

FIGS. 9A and 9B are diagrams for explaining operation example 3. Operation example 3 is an example of a scene in which a guide screen is automatically displayed. Users who purchase the image printing apparatus 101 for the first time do not know what function the LED 206 has. Therefore, as illustrated in FIG. 9A, in a case where the LED 206 is turned on for the first time, such a guide screen as illustrated in FIG. 9B is automatically displayed in an interrupting manner on the display device 201 without any operation by the user. In a case where any key in the hard key group 319 is pressed by the user, the screen returns to the original screen. An indication as such is included in the text on the guide display screen illustrated in FIG. 9B as well. By automatically displaying the guide screen in a case where the LED 206 is turned on for the first time, it is possible for the user to know the functions of the two-dimensional code key 205 and the LED 206 without reading the manual.

In the explanations of the above examples, the LED 206 is turned on in a case where a page corresponding to the screen being displayed on the display device 201 is present, and otherwise the LED 206 is turned off. However, the reverse is also possible. That is, it is possible that the LED 206 is turned off in a case where a page corresponding to the screen being displayed on the display device 201 is present, and otherwise the LED 206 is turned on. There may also be such a form in which the lighting color is changed. Furthermore, the control is not limited to turning on and off the LED 206, and any of blinking, turning on, and turning off of the LED 206 may be used. Moreover, although the LED 206 is taken as an example for the explanation, other members may be used as an example of the indicator light. Additionally, another notification unit (indicator) other than the LED 206 may be used as long as it is possible to notify the user that the two-dimensional code key 205 is effective.

Specific Operation Example 4

FIGS. 10A through 10C are diagrams illustrating operation example 4. Operation example 4 is an example in which the user is informed that the two-dimensional code key 205 is effective by use of a buzzer (notification sound output device) equipped other than the display unit as a notification unit, instead of the LED 206. In a case where the buzzer is used, it is possible that the LED 206 is not arranged on the operation panel 102. Further, it is also possible that the LED 206 is arranged on the operation panel 102 and the turn-on control of the LED 206 is performed together with the control of an output sound of the buzzer. The buzzer sound may be output for a predetermined time period. In a case where the user presses the two-dimensional code key 205 after outputting the buzzer sound, the two-dimensional code is displayed on the display device 201.

Specific Operation Example 5

FIGS. 11A through 11C are diagrams illustrating operation example 5. Operation example 5 is an example in which a pop-up screen is displayed as a notification unit on the display device 201, instead of the LED 206. That is, in this case, the display unit and the notification unit are integrally equipped. In the present example, as illustrated in FIG. 11A, after a predetermined time period (two seconds in the present example) has elapsed upon transition to a screen for which the two-dimensional code key 205 is effective, such a pop-up message 1101 is displayed as illustrated in FIG. 11B. The pop-up message 1101 (pop-up screen) pops up from the bottom of the screen being displayed on the display device 201. In this pop-up message 1101, the function of the two-dimensional code key 205 is explained in such a manner as "You can refer to the manual by pressing the two-dimensional code key.". Accordingly, it is possible for the user to recognize that the two-dimensional code key is effective. Thereafter, in a case where the user presses the two-dimensional code key 205, a two-dimensional code is displayed on the display device 201 as illustrated in FIG. 11C. In a case where the two-dimensional code is read by the camera of the mobile terminal 105, a predetermined manual page is displayed on the mobile terminal 105. It is also possible that the display device 201 is a touch panel display device and that the two-dimensional code is displayed in a case where the pop-up message 1101 is pressed.

As explained above, according to the present embodiment, it is possible for the user to determine whether the two-dimensional code key 205 is effective according to notification (for example, the turned-on state of the LED) by the notification unit without actually pressing the two-dimensional code key 205. Therefore, for example, it is possible to prevent the user from pressing the two-dimensional code key 205 in a case where a corresponding explanation page of a manual is not present, that is, in a case where the two-dimensional code key 205 is not effective. Furthermore, it is possible to make a user who operates the product for the first time or a user who is not used to use the product to understand specifications of the product such as, for example, the two-dimensional code key 205 is effective in a case where the LED 206 is on. As described above, according to the present embodiment, it is possible to appropriately prompt the user to perform an operation for displaying a code.

In a case where a two-dimensional code being displayed on the display device 201 is read by the mobile terminal 105 and a manual page is displayed on the browser of the mobile terminal 105, it is possible for the user to print the contents of the manual page with the image printing apparatus 101.

Furthermore, although the process of generating a two-dimensional code has been explained in S411 (corresponding to FIG. 6) of FIG. 4B, the present embodiment is not limited as such, and it is also possible that image data of a two-dimensional code that is preliminarily stored in the ROM 302, or the like, is read out in S411. In this case, for example, a "screen ID" as illustrated in FIG. 5 is stored in the ROM 302, or the like, in association with a file path of the image of the two-dimensional code. Then, the image of the two-dimensional code is read out through the file path corresponding to the screen ID of the screen being displayed, so as to be displayed in S412.

Second Embodiment

In the first embodiment, the example in which the two-dimensional code correspondence table 500 is stored in the ROM 302 of the image printing apparatus 101 has been explained. In this case, for example, if a URL for a linked destination of a manual is changed after the image printing apparatus 101 is sold, the two-dimensional code correspondence table 500 stored in the ROM 302 of the image printing apparatus 101 needs to be rewritten. In the present embodiment, an explanation is given of the example in which a redirection server is separately provided in addition to the manual server 106. Furthermore, the example in which information of a URL for a linked destination of the manual server 106 is stored in the redirection server will be explained.

<Process of Checking a Linked Destination URL for a Manual>

Figure 12:
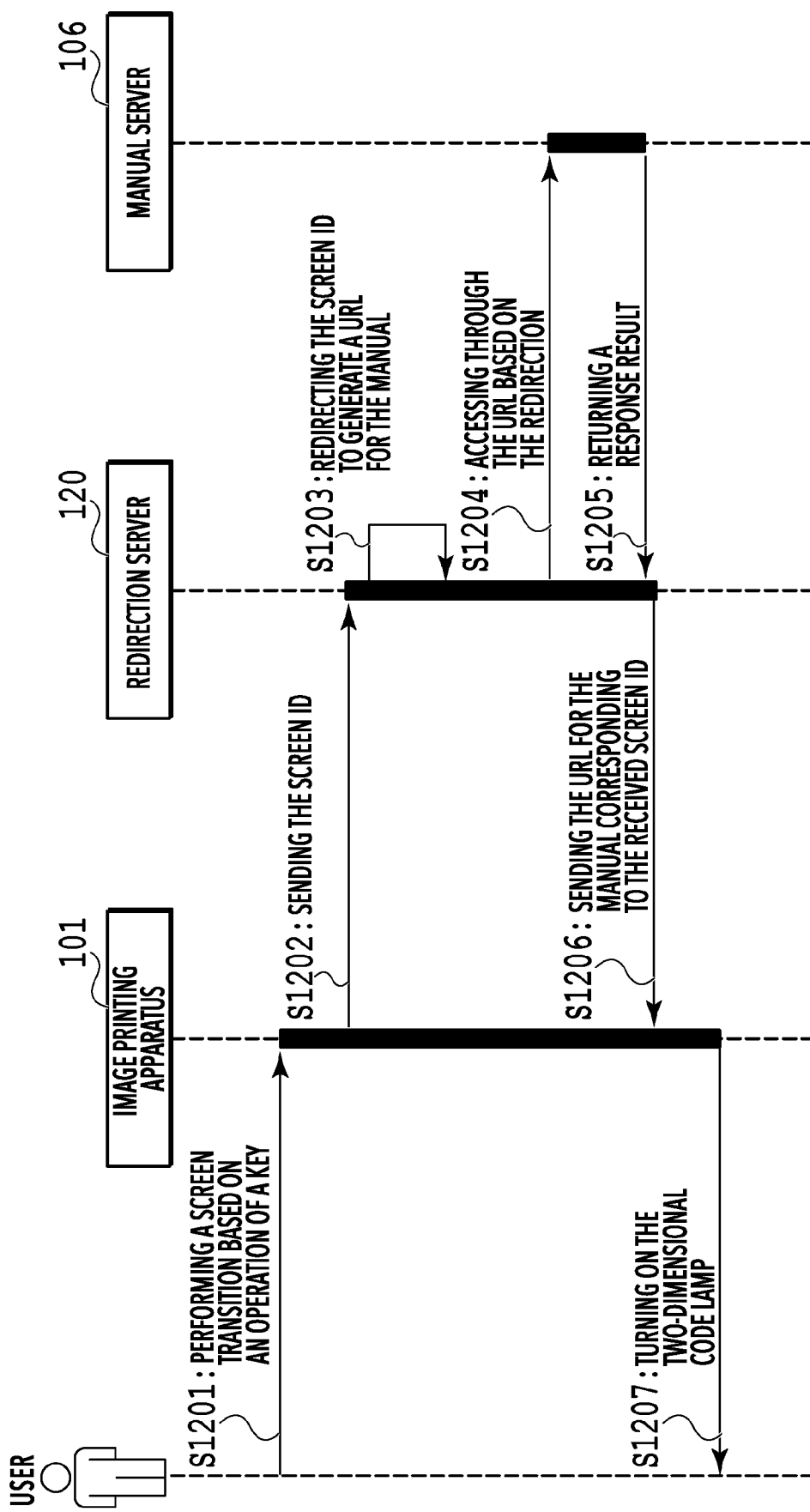
FIG. 12 is a sequence diagram illustrating an example of processing for checking whether there is a linked destination for a manual.

FIG. 12 is a sequence diagram illustrating an example of processing performed in the process of checking whether there is a linked destination for a manual in S403 of FIG. 4A in the present embodiment. In the present embodiment, the image printing apparatus 101, the manual server 106, and the redirection server 120 are mutually connected via a network. The image printing apparatus 101 is only required to be capable of communicating with the redirection server 120, and the redirection server 120 is only required to be capable of communicating with the image printing apparatus 101 and the manual server 106. That is, the image printing apparatus 101 may not be capable of communicating with the manual server 106. The series of processes in the present embodiment is basically the same as in the first embodiment, and explanations will be given mainly of the different aspect. The different aspect from the first embodiment corresponds to the process of S403 in FIG. 4A. Furthermore, the image printing apparatus 101 of the present embodiment is not provided with the two-dimensional code correspondence table 500. Instead, the redirection server 120 is provided with information (hereinafter referred to as a management table) corresponding to the two-dimensional code correspondence table 500.

In S1201 of FIG. 12, the image printing apparatus 101 performs a screen transition (corresponding to S402 of FIG. 4A) in response to reception of an operation through a key from the user. After the screen transition, the image printing apparatus 101 sends the screen ID of the screen being displayed on the display device 201 to the redirection server 120 in S1202.

Upon receiving the screen ID, the redirection server 120 refers to the management table, which is managed by the redirection server 120, in S1203, so as to search for a URL of the linked destination for the manual corresponding to the screen ID. The product code and product destination information may be separately sent from the image printing apparatus 101 to the redirection server 120 or may be sent together with the screen ID from the image printing apparatus 101. The redirection server 120 generates the URL of the linked destination, based on the information of the product code, product destination, and category.

In S1204, the redirection server 120 accesses the linked destination indicated by the generated URL, so as to check whether the linked destination is accessible. In S1205, the redirection server 120 receives a response result from the manual server 106, so as to determine whether the linked destination is accessible. In a case of being accessible, the redirection server 120 sends the generated URL to the image printing apparatus 101 in S1206. Accordingly, since it is possible for the image printing apparatus 101 to determine that there is a linked destination for a manual as a result of the process in S403, the LED 206 (two-dimensional code lamp) is turned on in S1207 (corresponding to S404 in FIG. 4A).

In S411 of FIG. 4B, a two-dimensional code including the URL received by the image printing apparatus 101 in S1206 is generated. Specifically, the process in S607 of FIG. 6 is executed by use of the URL received in S1206.

Furthermore, in FIG. 12, the processing in a case where there is a linked destination is illustrated. In a case where the redirection server 120 accesses the manual server 106 and no response is obtained, the redirection server 120 sends information indicative of inaccessible to the image printing apparatus 101. In response, the image printing apparatus 101 determines that there is no manual of a linked destination, and the processing proceeds to S405 in FIG. 4A, so that the LED 206 is turned off.

In a case where the redirection server 120 cannot obtain a response from the manual server 106, it is assumed that the URL of a linked destination has been changed. Therefore, in a case where the redirection server 120 cannot obtain a response from the manual server 106, a system administrator, or the like, may separately update the management table managed by the redirection server 120 so as to change the URL to an appropriate URL.

As explained above, according to the present embodiment, it is not necessary to rewrite the ROM 302 of the image printing apparatus 101 even in a case where a URL of an explanation page for a manual is changed. Therefore, for example, even in a case where a manual is added after the image printing apparatus 101 is sold, it is possible to appropriately control the LED 206 to be turned on.

Other Embodiments

Although the example in which a two-dimensional code is used for accessing a linked destination of the manual server 106 is explained in each of the above-described embodiments, the present embodiments are not limited as such. In a case where contents corresponding to the screen being displayed on the display device 201 are present in an external server, a two-dimensional code representing the URL for accessing the contents may be used.

Although the example in which a two-dimensional code is displayed on the display device 201 in a case where the two-dimensional code key 205 is pressed by the user is explained in each of the above-described embodiments, the present embodiments are not limited as such in terms of the trigger for displaying the two-dimensional code. For example, it is also possible that the image printing apparatus 101 includes an audio input device, so that the two-dimensional code is displayed on the display device 201 in a case where a predetermined audio operation is input by the user to the audio input device while the LED 206 is on. Moreover, any reception unit may be used as long as the reception unit is capable of receiving input of a predetermined user operation.

Furthermore, although the image printing apparatus 101 is taken as an example in the explanation of each of the above-described embodiments, the present embodiments are not limited as such. There may be such a form of using a control apparatus including a display unit in a small size or a control apparatus including a display unit whose display capability is limited.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-121765, filed Jun. 28, 2019, which is hereby incorporated by reference wherein in its entirety.

What is claimed is:

1. A printing apparatus comprising:
    a printing unit configured to print an image on a sheet;
    a display device configured to display a screen;
    a light emitting unit for emitting light, wherein the light emitting unit is provided on a surface of the printing apparatus on which the display device is provided and is arranged in a position different from a position of the display device; and
    at least one processor operating to:
    cause the display device to display a first screen to specify a consumable being in an error state and cause the light emitting unit to be in a first state; and
    cause the light emitting unit to be in a second state different from the first state in a case where the consumable is in a normal state,
    wherein the display device displays a second screen including a predetermined code, unlike the first screen, based on reception of an instruction to display the predetermined code from a user, and
    wherein the predetermined code is a code to cause an external terminal to display information for explaining a maintenance function of the printing apparatus by the predetermined code being captured by a camera of the external terminal.

2. The printing apparatus according to claim 1, wherein the first screen is a screen to notify a user that the consumable has run out.

3. The printing apparatus according to claim 2, wherein the consumable is a sheet used in the printing apparatus.

4. The printing apparatus according to claim 1, wherein the light emitting unit is an LED lamp.

5. The printing apparatus according to claim 1, further comprising a scanning unit configured to read an image of a document.

6. The printing apparatus according to claim 1, wherein the display device displays a third screen different from the first and second screens in a case where the consumable is in the normal state.

7. The printing apparatus according to claim 6, wherein the display device displays a fourth screen different from the first, second, and third screens based on reception of an instruction from the user in a case where the light emitting unit is in the second state.

8. The printing apparatus according to claim 1, wherein the first state is a blinking state.

9. The printing apparatus according to claim 1, wherein the second state is a turned-on state or a turned-off state.

10. The printing apparatus according to claim 1, wherein a distance between a left end and a right end of the light emitting unit is longer than a distance between a top end and a lower end of the light emitting unit.

11. The printing apparatus according to claim 1, wherein the printing unit prints an image on a sheet by using an inkjet system.

12. The printing apparatus according to claim 1, wherein a side of a top end of the display device is positioned above a side of the top end of the light emitting unit in a predetermined surface.

13. The printing apparatus according to claim 1, wherein the predetermined code is a QR code.

14. The printing apparatus according to claim 1, wherein the instruction from the user is issued via a reception unit provided integrally with the light emitting unit.

15. The printing apparatus according to claim 1, wherein in a case where the light emitting unit is in the second state, the display device displays a fourth screen different from the first, second, and third screens based on reception of an instruction from a user.

16. The printing apparatus according to claim 15, wherein the fourth screen is a screen which notifies a user to issue an instruction to a printing apparatus in a state where the light emitting unit is in the first state.

17. A printing apparatus comprising:
a printing unit configured to print an image on a sheet;
a display device configured to display a screen;
a light emitting unit for emitting light, wherein the light emitting unit is provided on a surface of the printing apparatus on which the display device is provided and is arranged in a position different from a position of the display device; and
at least one processor operating to:
cause the display device to display a first screen to specify a consumable being in an error state and cause the light emitting unit to be in a first state; and
cause the light emitting unit to be in a second state different from the first state in a case where the consumable is in a normal state,
wherein the display device displays a second screen including a predetermined code, unlike the first screen, based on reception of an instruction to display the predetermined code from a user, and
wherein the predetermined code is a code to cause an external terminal to display information for explaining a method of adjusting a print head of the printing apparatus by the predetermined code being captured by a camera of the external terminal.

18. A printing apparatus comprising:
a printing unit configured to print an image on a sheet;
a display device configured to display a screen;
a light emitting unit for emitting light, wherein the light emitting unit is provided on a surface of the printing apparatus on which the display device is provided and is arranged in a position different from a position of the display device; and
at least one processor operating to:
cause the display device to display a first screen to specify a consumable being in an error state and cause the light emitting unit to be in a first state; and
cause the light emitting unit to be in a second state different from the first state in a case where the consumable is in a normal state,
wherein the display device displays a second screen including a predetermined code, unlike the first screen, based on reception of an instruction to display the predetermined code from a user, and
wherein the predetermined code is a code to cause an external terminal to display explanatory information for solving a printing trouble in the printing apparatus by the predetermined code being captured by a camera of the external terminal.

* * * * *